(12) United States Patent
Blancke et al.

(10) Patent No.: US 12,727,545 B2
(45) Date of Patent: Sep. 8, 2026

(54) SUPPORT WHEELS FOR A PICKUP HEADER

(71) Applicant: CNH Industrial Belgium N.V., Zedelgem (BE)

(72) Inventors: Jeffrey Blancke, Markegem (BE); Stijn Van Belleghem, Maldegem (BE); Simon Beelaert, Adegem (BE)

(73) Assignee: CNH Industrial Belgium N.V., Zedelgem (BE)

( * ) Notice: Subject to any disclaimer, the term of this patent is extended or adjusted under 35 U.S.C. 154(b) by 376 days.

(21) Appl. No.: 18/496,517

(22) Filed: Oct. 27, 2023

(65) Prior Publication Data

US 2024/0138309 A1 May 2, 2024

(30) Foreign Application Priority Data

Oct. 28, 2022 (EP) .................................... 22204594

(51) Int. Cl.
*A01D 89/00* (2006.01)
*A01D 43/08* (2006.01)

(52) U.S. Cl.
CPC .......... *A01D 89/004* (2013.01); *A01D 43/086* (2013.01)

(58) Field of Classification Search
CPC ...... A01D 89/004; A01D 65/04; A01D 65/08; A01D 89/001; A01D 87/0053; A01D 87/02; A01D 89/006
See application file for complete search history.

(56) References Cited

U.S. PATENT DOCUMENTS 614,887 A * 11/1898 Pinolehto ............... A01D 87/02 56/360
938,959 A * 11/1909 Boyer .................... A01D 87/02 198/511
3,771,302 A * 11/1973 Vogt .................. A01D 87/0007 56/364
4,171,606 A * 10/1979 Ziegler .................. A01D 41/10 56/364
4,199,030 A * 4/1980 Chance .................. A01B 79/00 111/131
5,855,109 A * 1/1999 Vande Ryse ........ A01F 15/0715 100/88
5,916,116 A * 6/1999 Vande Ryse ......... A01D 89/004 56/341

(Continued)

FOREIGN PATENT DOCUMENTS

DE 1200051 B 9/1965
EP 0386430 A1 9/1990

(Continued)

OTHER PUBLICATIONS

Extended European Search Report for EP Application No. 22204594.0 dated Mar. 13, 2023 (6 pages).

*Primary Examiner* — Monica L Perry
(74) *Attorney, Agent, or Firm* — Foley & Lardner LLP

(57) ABSTRACT

A pickup assembly for an agricultural harvester includes a pickup assembly frame including a forward portion and a rearward portion. A pair of gauge wheels are attached to the forward portion of the pickup assembly frame, and at least one support wheel is attached to the rearward portion of the pickup assembly frame. The relative position of the support wheel is adjustable with respect to the pickup assembly frame.

14 Claims, 5 Drawing Sheets

(56) References Cited

U.S. PATENT DOCUMENTS 6,164,050 A * 12/2000 Vande Ryse ......... A01D 89/004 100/88
7,552,579 B2 * 6/2009 Tippery ............... A01B 73/005 56/228
7,726,111 B2 * 6/2010 Grywacheski ....... A01D 89/004 56/364
9,015,966 B2 * 4/2015 Boll ..................... A01D 89/008 37/341
11,497,169 B2 * 11/2022 Figgins ................ A01D 89/004
2020/0041340 A1 * 2/2020 Schade ................. G01J 3/0232
2024/0164254 A1 * 5/2024 Rathmer .............. A01B 43/005
2024/0196798 A1 * 6/2024 Blancke .................. A01F 15/10
2024/0324512 A1 * 10/2024 Beelaert ............... A01D 75/187
2025/0151654 A1 * 5/2025 Vermander .......... A01D 89/004
2025/0204327 A1 * 6/2025 Beelaert ............... A01D 89/008

FOREIGN PATENT DOCUMENTS

EP 4066618 A1 10/2022
EP 4385310 A1 * 6/2024 ............. A01D 51/00
GB 921874 A 3/1963
WO 00/13481 A1 3/2000
WO WO-2023232721 A1 * 12/2023 ........... A01D 89/004

* cited by examiner

SUPPORT WHEELS FOR A PICKUP HEADER

FIELD

The present invention relates to a pickup assembly for an agricultural harvester, the pickup assembly comprising a pickup assembly frame, a pickup unit carried by the pickup assembly frame and configured to pick up crop from a field, and a feeding auger, rotatably coupled to an auger arm, the auger arm being pivotably connected to the pickup assembly frame at a pivot axle. The pickup assembly further comprises wheels for supporting the pickup assembly as it moves along a surface. The present invention further relates to an agricultural harvester comprising such a pickup assembly.

BACKGROUND

Certain agricultural machines, such as forage harvesters, forage wagons and balers, collect crop material that has been cut from the field. The component of such agricultural machines which gathers the crop material and feeds it further into the machine for processing is generally known as a pickup assembly. A pickup assembly comprises a pickup unit, typically in the form of a pickup drum rotatably mounted on the pickup assembly frame. The pickup drum has radially arranged projecting tines to collect the crop material and propel it upwards, past a guiding element, and then into a feeding auger that moves the crop laterally towards a feed channel through which the crop material is conveyed into the machine for subsequent processing. Such subsequent processing may, for example, involve baling, threshing, chopping, storing and/or depositing.

The effectiveness of crop pickup is directly affected by the height of the tines of the pickup drum above the ground, otherwise known as the running height. Too high, and the tines will not effectively gather all the crop, leaving some on the ground behind the forage harvester. Too low, and the pickup tines may collide with the ground increasing the load on the system and potentially overloading the pickup tines. Furthermore, bringing the tines too close too the ground may lead to the intake of sand or stones, thereby causing damage to many different parts of the pickup. Running height control thus is essential to maximising operational efficiency.

Crop fields are rarely flat meaning forage harvesters must contend with undulations and localised bumps and dips. Control of the running height under such circumstances can be challenging.

Forage harvester pickup assemblies typically comprise a pair of gauge wheels located towards the front of the pickup assembly which contact the ground during operation of the forage harvester collecting crop. The gauge wheels are typically height adjustable so that the running height can be adjusted to take account of local ground variations and conditions. Nonetheless, despite the provision of adjustable gauge wheels, control of the running height remains a challenge.

During transportation of a forage harvester from place to place, the pickup assembly is typically raised and pivoted away from the ground to avoid damaging the pickup assembly during transport. In this transport position, the weight of the pickup assembly is generally cantilevered from the main body of the forage harvester. If rough ground must be traversed during the transport of the forage harvester, the cantilevered weight of the pickup assembly can lead to instability thereby making transport of the forage harvester more difficult and uncomfortable.

It is against this background that the present invention has been developed.

SUMMARY OF THE INVENTION

According to an aspect of the invention there is provided a pickup assembly for an agricultural harvester, the pickup assembly comprising: a pickup assembly frame comprising a forward portion and a rearward portion; a pair of gauge wheels rotatably attached to the forward portion of the pickup assembly frame; and at least one support wheel rotatably attached to a support wheel arm that is pivotally connected to the rearward portion of the pickup assembly frame.

The pickup assembly of the present invention is advantageous as the support wheel may be positioned to better ensure contact with the ground during use thereby facilitating better control of the running height. The pivotable support wheel arm, for example, allows for improved suspension, better ground following, or more accurate control over the position of the support wheel relative to the pickup assembly frame.

Preferably, the at least one support wheel comprises a pair of support wheels, rotatably attached to respective support wheel arms that are pivotally connected to the rearward portion of the pickup assembly. Together with the two gauge wheels at the front, the pair of support wheels provide four contact points to the ground instead of the traditional two, thereby improving the stability of the pickup assembly. This even more so when the pivotable support wheel arms are configured to provide suspension, ground following, and/or height adjustment.

The support wheel arm may be pivotally attached to the pickup assembly frame proximate a first end of the support wheel arm and pivotally connected to a length-adjustable arm proximate a second end of the support wheel arm, wherein the length-adjustable arm is pivotally connected to the pickup assembly frame. The provision of this length-adjustable arm facilitates positioning of the support wheel by application of leverage to the support wheel arm. The length-adjustable arm may, for example, comprise a pneumatic, cylinder, a hydraulic cylinder, or a screw cylinder.

The support wheel arm may comprise a bend located between the first and second ends of the support wheel arm to improve the kinematic range and efficiency of the support wheel.

In one example, the support wheel may be rotatably connected to the support wheel arm proximate the bend in the support wheel arm to appropriately position the wheel in the kinematic system.

Optionally, the length-adjustable arm is pivotally connected to the pickup assembly frame at a position spaced from the pivotal connection between its respective support wheel arm and the pickup assembly frame to improve the kinematic range and efficiency of the support wheel.

The pickup assembly may further comprise a suspension arrangement coupling the at least one support wheel and the respective support wheel arm to the pickup assembly frame for absorbing shocks and to better keep the support wheels in contact with the ground. The suspension arrangement may be formed by and/or connected to the length-adjustable arm.

The length-adjustable arm may be manually adjustable, or operated by a control electronics. The electronic control may be automatic, or semi-automatic, based on user input and/or sensor information. Preferably, the pickup assembly comprises a support wheel actuator configured to move the at least one support wheel from a first position with respect to the pickup assembly frame to a second position with respect to the pickup assembly frame to facilitate automatic deployment of the support wheels. The support wheel actuator may be formed by and/or connected to the length-adjustable arm. For example, pneumatic, hydraulic, or electric actuators may be used for this purpose.

In another aspect, the present invention provides an agricultural harvester comprising a pickup assembly as described above.

Optionally, the agricultural harvester is configured to support the pickup assembly in an operational position during a crop collection operation, and in a transport position during movement of the agricultural harvester from one crop collection location to another, wherein, when the pickup assembly is in the transport position, the at least one support wheel is adjustable from a retracted position in which it does not make contact with a ground surface, to an extended position in which it does make contact with the ground surface. This is advantageous as the support wheels may be used to support the pickup assembly during transport as well as during use collecting crops.

In a further aspect, the present invention provides a control system for controlling a support wheel of a pickup assembly with a support wheel actuator. The control system comprises one or more controllers and is configured to: receive a first signal indicative of a ground surface location; determine a support wheel deployment position in dependence on the ground surface location; and issue a control signal to cause the actuator to move the support wheel to the support wheel deployment position. The control system facilitates remote and automatic positioning of the support wheel. The control system may be configured to monitor and adjust the support wheel position during use and/or transport of the pickup assembly to account for changes in terrain.

Optionally, the control system is configured to: receive a second signal indicative of a mode of operation of the pickup assembly, wherein a signal indicative of a first mode of operation is indicative of use of the pickup assembly for crop collection, and a signal indicative of a second mode of operation is indicative of transport of the agricultural harvester from one crop collection location to another; and determine the support wheel deployment position in dependence on the mode of operation.

BRIEF DESCRIPTION OF THE DRAWINGS

Embodiments of the invention will now be described by way of example with reference to the accompanying drawings, in which.

DETAILED DESCRIPTION

In the following, a pickup assembly is described in which the above described invention may be advantageously used. In addition to the invention claimed in the appended claims, further improvements may be implemented in the same pickup assembly. It is noted that, while some features of these other improvements may appear essential in the context of those other improvements, it should not be concluded therefrom that such features are essential to the now claimed invention too. Similarly, it may be suggested that a feature essential for the currently claimed invention is merely optional in the context of the other possible improvements, which is not to be interpreted as an attempt to broaden the scope of protection beyond that what is claimed in the appended claims.

The directions up, down, forward, and rearward are herein defined relative to the general orientation and direction of an agricultural harvester and its attached pickup assembly driving over a field and picking up crop.

Figure 1:
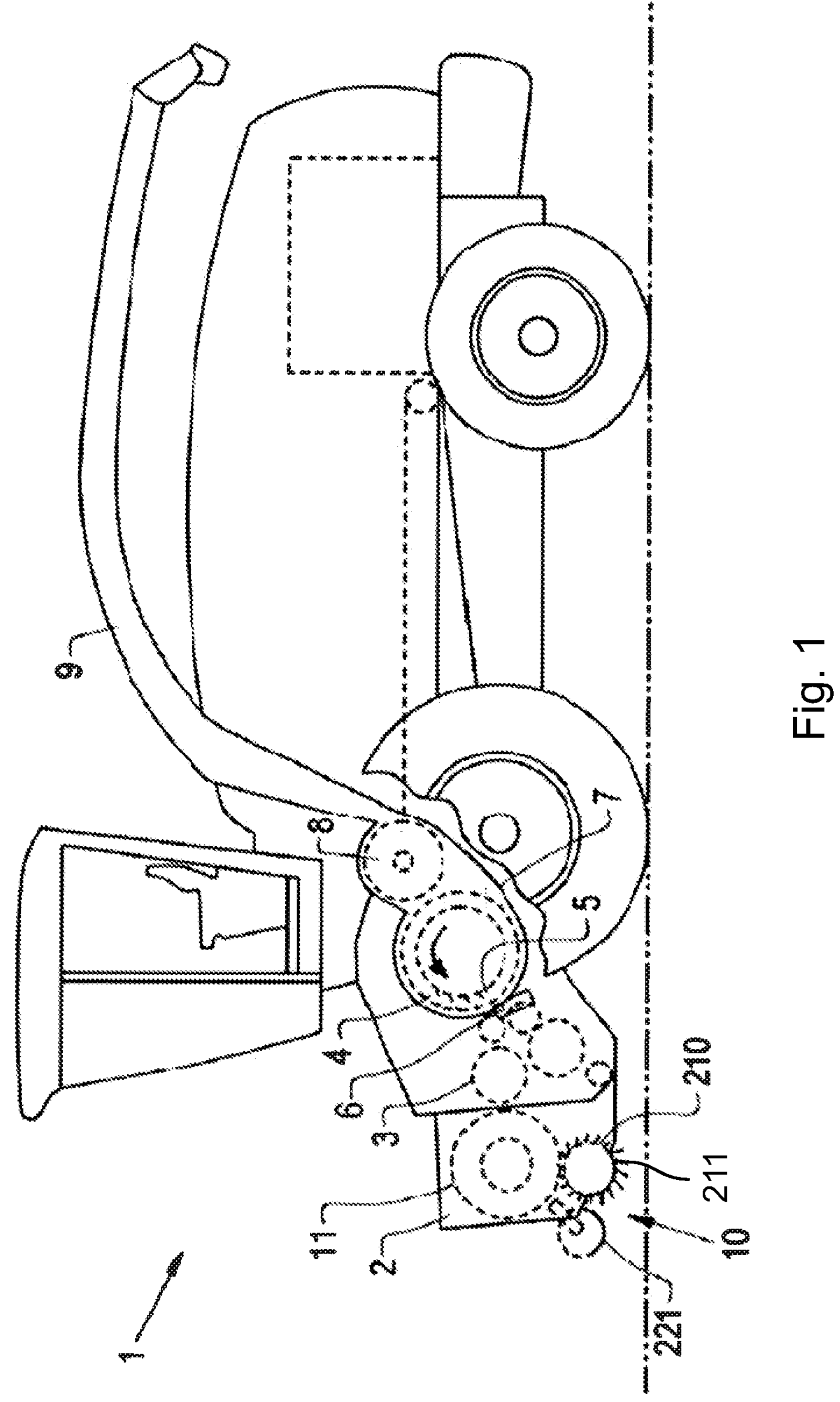
FIG. 1 schematically shows a forage harvester with a pickup assembly that may embody one or more of the inventions described herein.

FIG. 1 shows a schematic side view of an exemplary embodiment of an agricultural vehicle, illustrated in the form of a forage harvester 1. As the harvester 1 advances through a field, crops, e.g. grass or alfalfa, are gathered by a pickup assembly 2 and transported to a central crop inlet of the forage harvester 1 where they enter the harvester 1 through a set of feed rolls 3. The feed rolls 3 guide the crops in the form of a mat with a given thickness towards the cutting drum 4, which rotates in the direction indicated by the arrow, about a rotation axis that is transversal to the direction of movement of the crops. Knives 5 are mounted on and distributed along the full circumference of the drum 4, so that the knives 5 pass by a stationary shear bar 6 as the drum 4 rotates, thereby chopping the crops into small pieces which are further transported between the cutting drum 4 and a concave 7. The chopped material is then ejected by a blower 8 through a spout 9. It should be appreciated that while the agricultural vehicle is illustrated and described as a forage harvester 1, in some embodiments the pickup assembly may be used in combination with other agricultural vehicles such as a grass wagon, a combine harvester, or a baler, e.g., a large square baler, a small square baler, or a round baler.

The pickup assembly 2 comprises a pickup unit 10 that includes a pickup drum 210 that carries a plurality of tines 211. The pickup drum 210 is configured to rotate about a pickup axis that is transverse to the direction of movement of the harvester 1. The rotating tines 211 pick the crop material up from the ground and move it toward a crop material conveyor in the form of a feeding auger 11. The feeding auger 11 conveys the picked up crop material toward an inlet of the harvester 1, or to a central location where a separate conveyor conveys the crop material toward the interior of the harvester 1.

Figure 2:
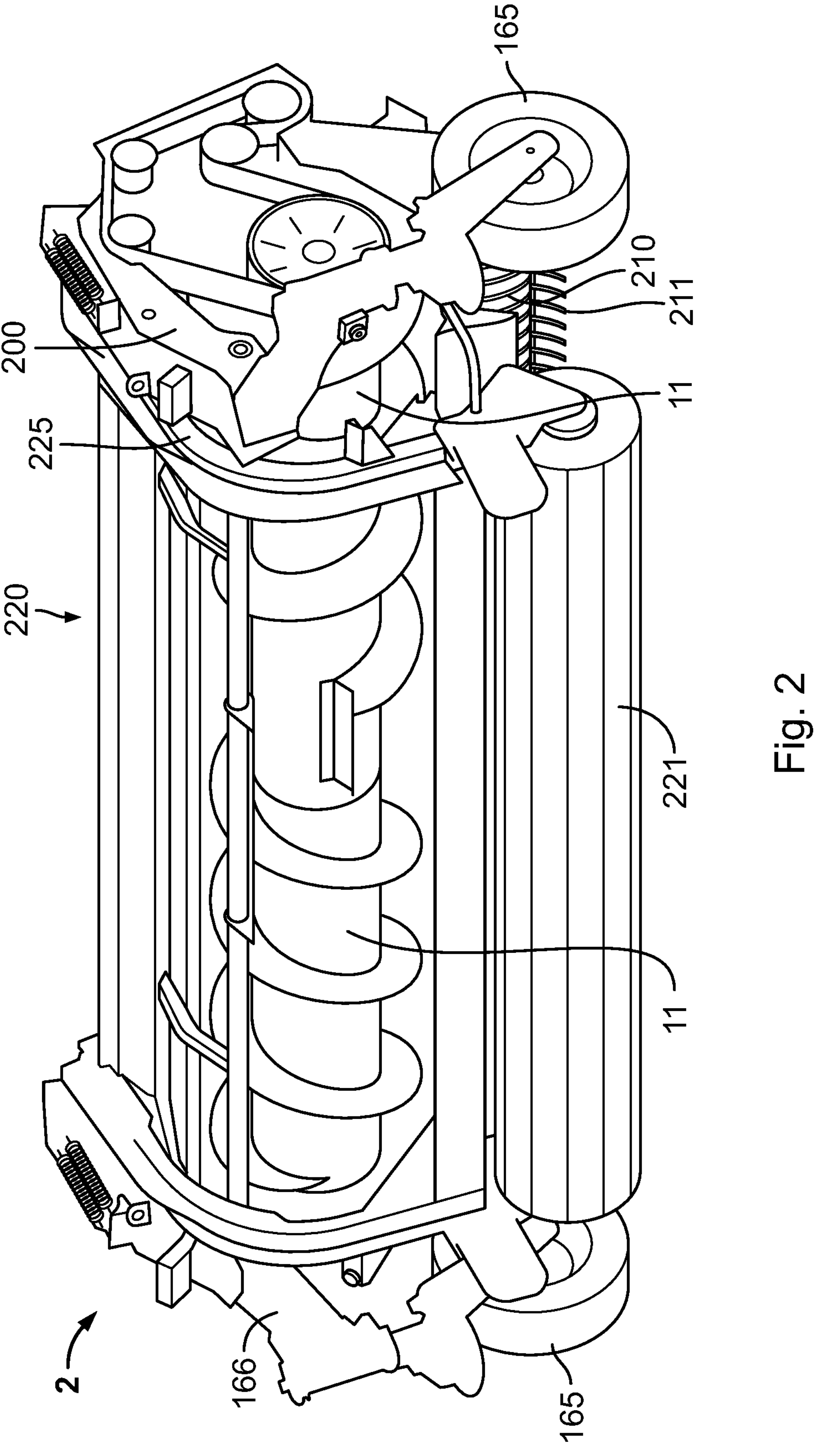
FIG. 2 shows a perspective front view of a pickup assembly that may be used with the forage harvester of FIG. 1.
Figure 3:
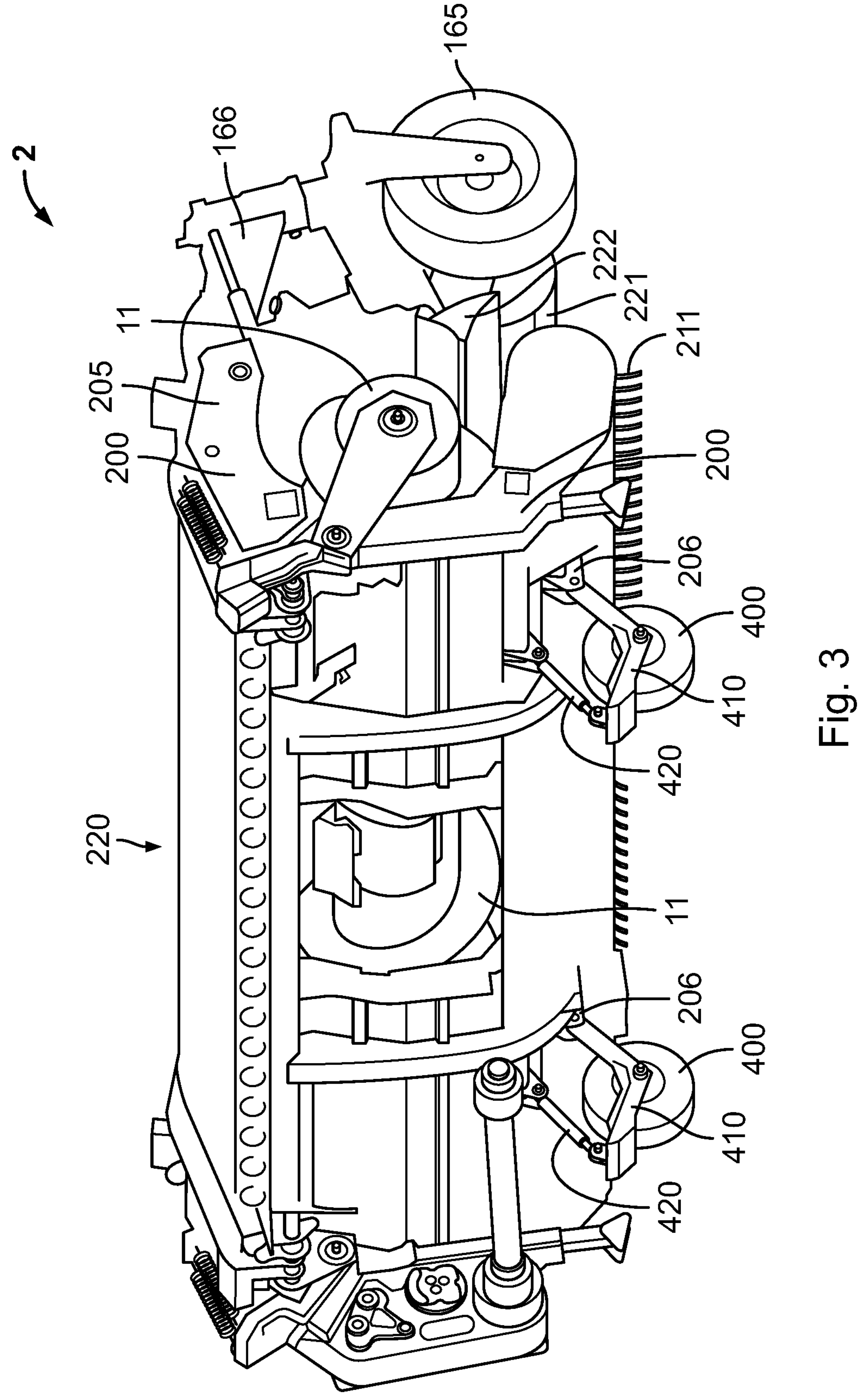
FIG. 3 shows a perspective rear view of the pickup assembly of FIG. 2.
Figure 4:
FIG. 4 shows a cross section of the pickup assembly of FIGS. 2 and 3.
Figure 4:
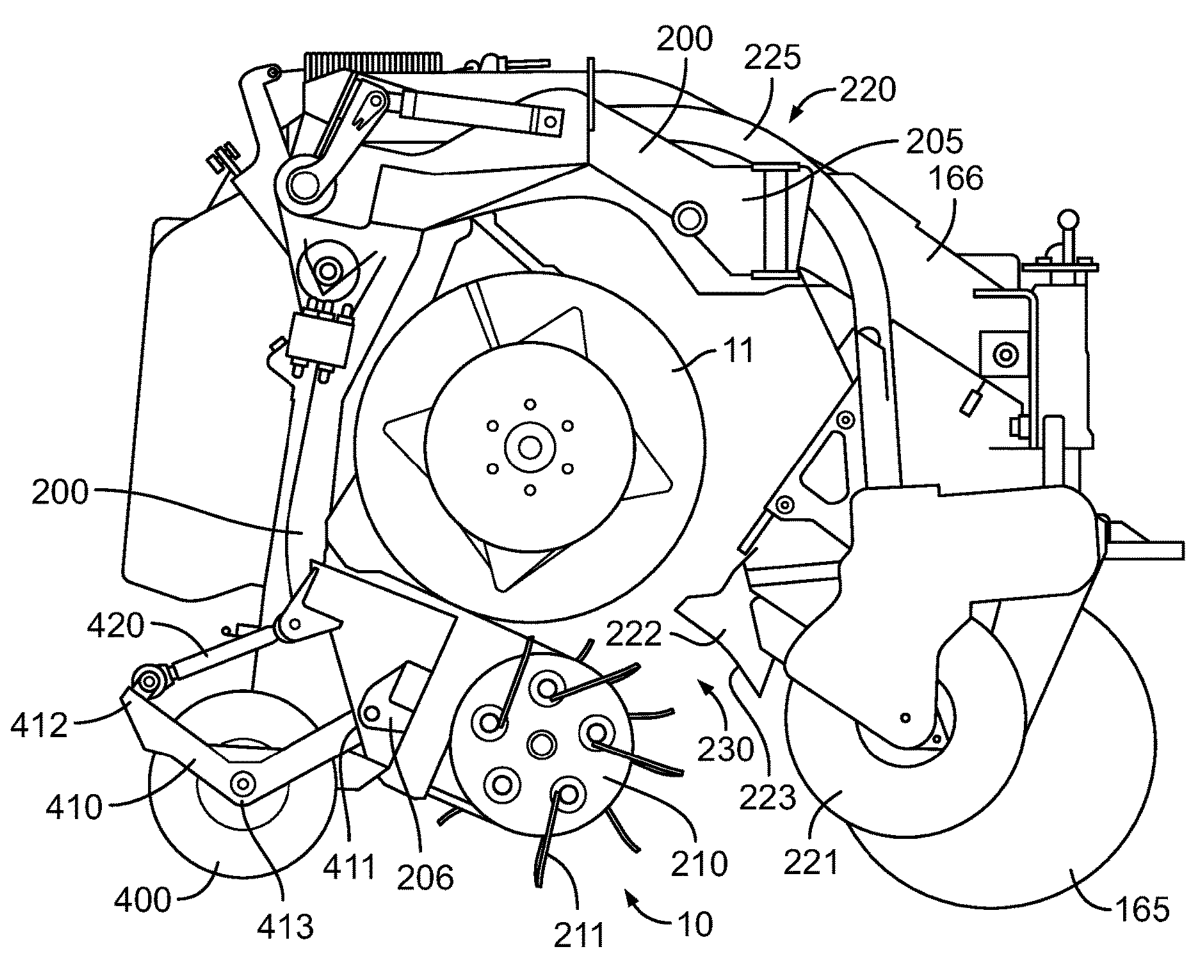

FIGS. 2 to 4 show various aspects of the pickup assembly 2 in further detail. The pickup assembly also includes a wind guard assembly 220. The wind guard assembly 220 may include a cylindrical roller 221, which defines a roller axis about which the roller 221 rotates during operation. Like the pickup axis, the roller axis is generally transverse to the direction of movement of the harvester 1. It should be appreciated that while the roller 221 is illustrated and described as a cylindrical roller 221, the roller 221 can be formed to have other shapes. The roller 221 may be a fixed roller, i.e., a roller that generally maintains a fixed position of the roller axis during operation, or an adjustable roller, i.e., a roller that can be appreciably re-positioned so the roller axis moves to accommodate for variations swath height.

Other wind guard assemblies may, for example, have two rollers to guide crop material towards the crop material conveyor. In such wind guard assemblies, a front roller rolls on top of the swath of crop material as it is being collected while a rear roller is positioned above the tines 211 to guide the crop material toward the crop material conveyor 11 when it is picked up.

The pickup drum 210, feeding auger 11, and wind guard assembly 220 are all carried by a frame 200 of the pickup assembly 2, as may other functional parts of the pickup assembly 2. Typically, the pickup assembly 2 is provided as a separate header that can be mounted to the front of the harvester 1 when needed. Alternatively, the pickup assembly 2 is fixedly attached to a chassis of the forage harvester 1.

FIG. 4 shows a cross section of the pickup assembly 2 of FIGS. 2 and 3. As the earlier Figures, FIG. 4 shows the wind guard roller 221 of the wind guard assembly 220, the pickup drum 210 with its plurality of tines 211, and the feeding auger 11. The wind guard roller 221 is followed by a guidance plate 222. An infeed channel 230 is formed between the wind guard roller 221 and an infeed channel surface 223 of the guidance plate 222 on one side and the pickup drum 210 with its tines 211 on the other side. The geometry of the infeed channel 230 may be adjusted by raising and lowering the wind guard assembly 220, by pivoting or otherwise moving the guidance plate 222 relative to the wind guard frame 225, or by moving the pickup drum 210 relative to the pickup assembly frame 200.

Referring to FIGS. 3 and 4, the pickup assembly frame 200 comprises a forward portion 205 located towards the foremost side of the pickup assembly 2, and a rearward portion 206 located towards the rearmost side of the pickup assembly 2. A pair of height adjustable gauge wheels 165 are attached to the forward portion 205 of the pickup assembly frame 200 by gauge wheel arms 166, pivotably supported at respective lateral ends of the pickup assembly frame 200. A pair of height adjustable support wheels 400 are attached to the rearward portion 206 of the pickup assembly frame 200 by support wheel arms 410, pivotably supported proximate respective lateral ends of the pickup assembly frame 200. While the pickup assembly 2 shown here comprises a pair of support wheels 400, other embodiments may use only one, or 3 or more support wheels. Together with the two gauge wheels 165 at the front, the pair of support wheels 400 of the now shown embodiment provide four contact points to the ground instead of the traditional two, thereby improving the stability of the pickup assembly 2. This even more so when the pivotable support wheel arms 410 are configured to provide suspension, ground following, and/or height adjustment.

As best shown in FIG. 4, the support wheel arms 410 comprise an upwardly facing bend 413 located between first 411 and second 412 ends of the support wheel arms 410. The support wheel arms 410 are pivotably attached to the pickup assembly frame 200 proximate their first ends 411 and pivotably attached to length-adjustable arms 420 proximate their second ends 412. The length-adjustable arms 420 are themselves pivotably attached to the pickup assembly frame 200 at a position spaced from the connection of the attached support wheel arm 410 and the pickup assembly frame 200. The support wheels 400 are rotatably mounted to the support wheel arms 410 proximate the bend 413.

The relative position of the support wheels 400 with respect to the pickup assembly frame 200 may be adjusted by adjusting the length of the length-adjustable arms 420. The length of the length-adjustable arms 410 may be adjusted by any suitable mechanical, electromechanical, hydraulic, or pneumatic system. Each support wheel 400 may be positioned at the same relative position from the pickup assembly frame 200. Alternatively, the support wheels 400 may be positioned at different relative positions to one another to account to variations in the ground terrain across the lateral width of the pickup assembly. While the position adjustment of the support wheels 400 of this pickup assembly is configured to be mainly in the vertical direction, alternatively arranged adjustment mechanisms may provide for some additional horizontal displacement too.

Preferably, the support wheel arms 410 and/or the length-adjustable arms 420 are connected to the pickup assembly frame 200 via a suspension arrangement. The suspension arrangement may be any suitable suspension arrangement such as a spring/damper suspension system, or a pneumatic or hydraulic suspension system. The suspension may be provided by the length-adjustable arms 420, or by separate springs or other means of suspension, connected to the length-adjustable arms 420 and/or the support wheel arms 410.

During operation of the forage harvester 1 collecting crop from a field, the pickup assembly 200 is supported in an operational position such that the gauge wheels 165 and support wheels 400 contact the ground. The running height of the pickup unit 10 can be adjusted by adjusting the relative position of the gauge wheels 165 with respect to the pickup assembly frame 200 by pivoting the gauge wheel arms 166 in relation to the pickup assembly frame 200. The running height of the pickup unit 10 can also be adjusted by adjusting the relative position of the support wheels 400 with respect to the pickup assembly frame 200 by pivoting the support wheel arms 410 in relation to the pickup assembly frame 200. This is achieved by adjusting the length of the length-adjustable arms 420.

The position of the gauge wheels 165 and the support wheels 400 may be manually set and adjusted either directly by an operator, or remotely from a controller carried by the operator or located in a cab of the forage harvester 1 for example. The forage harvester 1 may comprise one or more sensors for sensing the position of the ground with respect to the pickup assembly 2. The position of the gauge wheels 165 and/or the support wheels 400 may be automatically adjusted in dependence on the sensor output. The sensor may advantageously be located on the pickup assembly frame 200. The length-adjustable arms 420 may, for example, be a pneumatic, hydraulic or electric actuator. Alternatively, a separate actuator is attached to the length-adjustable arm 420 configured to adjust the length of the length-adjustable arms 420 in response to user control input or sensor data.

During transport of the forage harvester 1 from one place to another, the pickup assembly 2 is lifted and tilted away from the ground to avoid damage to the pickup assembly 2 during transportation. In this transport position, the support wheels 400 may be manually or remotely lowered so that they come into contact with the ground to support the pickup assembly 2 during transportation. Alternatively, the support wheels 400 may be automatically lowered.

A control system 500 for controlling the position of support wheels 400 of the pickup assembly 200 may be provided, The control system 500 may comprise one or more controllers 501 configured to receive an input signal 504 indicative of the ground surface location. The input signal 504 may be provided, for example, by the output of the ground position sensor described above. The input signal 504 may be used to determine a support wheel deployment position which is dependent on the ground surface location. The control system 500 may then issue a control signal 530 to the actuator of the length-adjustable arms 420 to cause the actuator to adjust the length of the length-adjustable arms 420 thereby to moving the support wheels 400 to the determined support wheel deployment position.

The control system 500 may be configured to receive one or more further input signals 506, 508 indicative of, for example, a mode of operation of the pickup assembly 2, or a current position of the support wheels 400 with respect to the pickup assembly frame 200. Where the further input signal 506 is indicative of the mode of operation of the pickup assembly 2, the input signal 506 may comprise a first mode of operation indicative of use of the pickup assembly 2 for crop collection, or a signal indicative of a second mode of operation indicative of transport of the agricultural harvester 1 from one crop collection location to another. The determination of the support wheel deployment position may me made dependence on the mode of operation input signal 506 in addition to the ground surface location input signal 504.

Figure 5:
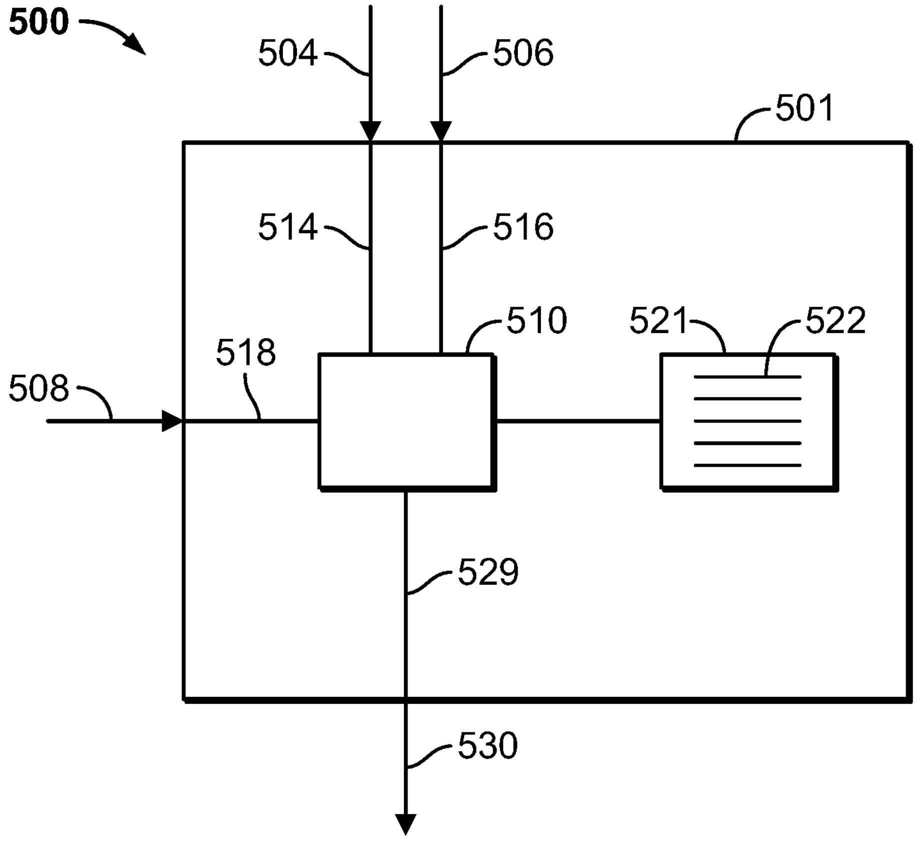
FIG. 5 shows a schematic representation of a control system for controlling the position of support wheels of the pickup assembly.

FIG. 5 illustrates an example control system architecture suitable for implementing the control system 500 described above. The control system 500 may comprise one or more controllers 501, wherein the or each controller 501 comprises at least one electronic processor 510 having one or more electrical input(s) 514, 516, 518 for receiving one or more of input signals 504, 506, 508, and one or more electrical output(s) 529 for outputting one or more output signals 530. The or each controller 501 further comprises at least one memory device 521 electrically coupled to the at least one electronic processor 510 and having instructions 522 stored therein. The at least one electronic processor 510 is configured to access the at least one memory device 521 and execute the instructions 522 thereon so as to determine the support wheel deployment position.

The, or each, electronic processor 510 may comprise any suitable electronic processor (e.g., a microprocessor, a microcontroller, an ASIC, etc.) that is configured to execute electronic instructions. The, or each, electronic memory device 521 may comprise any suitable memory device and may store a variety of data, information, threshold value(s), lookup tables or other data structures, and/or instructions therein or thereon. In an embodiment, the memory device 521 has information and instructions for software, firmware, programs, algorithms, scripts, applications, etc. stored therein or thereon that may govern all or part of the methodology described herein. The processor, or each, electronic processor 510 may access the memory device 521 and execute and/or use that or those instructions and information to carry out or perform some or all of the functionality and methodology describe herein.

The at least one memory device 521 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 501 have been described comprising at least one electronic processor 510 configured to execute electronic instructions stored within at least one memory device 521, which when executed causes the electronic processor(s) 510 to carry out the method as hereinbefore described. However, it is contemplated that the control system 500 is not limited to being implemented by way of programmable processing devices, and that at least some of the functionality of the control system 500 may equally be implemented by way of non-programmable hardware, such as by way of non-programmable ASIC, Boolean logic circuitry, etc.

It will be appreciated that various changes and modifications can be made to the pickup assembly 2 and to the control system 500 without departing from the scope of the present application. In particular, it is not essential that the support wheel arms 410 be bent or that the support wheels 40 be mounted proximate the bend 413. If a bent, or otherwise shaped, support wheel arms 410 are used, the length-adjustable arms 420 may be pivoted from the pickup assembly frame from the same point as the support wheel arms 410.

The invention claimed is:

1. A pickup assembly for an agricultural harvester, the pickup assembly comprising:

a pickup assembly frame comprising a forward portion and a rearward portion;

at least one support wheel arm that is pivotally connected to the rearward portion of the pickup assembly frame;

a pair of gauge wheels rotatably attached to the forward portion of the pickup assembly frame; and at least one support wheel rotatably attached to the at least one support wheel arm.

2. The pickup assembly as claimed in claim 1, wherein the at least one support wheel comprises a pair of support wheels, wherein the at least one support wheel arm comprises a pair of support wheel arms that are pivotally connected to the rearward portion of the pickup assembly frame, wherein the pair of support wheels are respectively attached to respective ones of the pair of support wheel arms.

3. The pickup assembly of claim 1, further comprising a length-adjustable arm, wherein the at least one support wheel arm is pivotally attached to the pickup assembly frame proximate a first end of the at least one support wheel arm and pivotally connected to the length-adjustable arm proximate a second end of the at least one support wheel arm, wherein the length-adjustable arm is pivotally connected to the pickup assembly frame.

4. The pickup assembly of claim 3, wherein the at least one support wheel arm comprises a bend located between the first and second ends of the at least one support wheel arm.

5. The pickup assembly of claim 4, wherein the at least one support wheel is rotatably attached to the at least one support wheel arm proximate the bend.

6. The pickup assembly of claim 3, wherein the length-adjustable arm is pivotally connected to the pickup assembly frame at a position spaced from the pivotal connection between the at least one support wheel arm and the pickup assembly frame.

7. The pickup assembly of claim 3, further comprising a suspension arrangement coupling the at least one support wheel and the at least one support wheel arm to the pickup assembly frame, wherein the suspension arrangement comprises the length-adjustable arm.

8. The pickup assembly of claim 3, further comprising a support wheel actuator configured to move the at least one support wheel from a first position with respect to the pickup assembly frame to a second position with respect to the pickup assembly frame, wherein the support wheel actuator comprises the length-adjustable arm.

9. The pickup assembly of claim 1, further comprising a suspension arrangement coupling the at least one support wheel and the at least one support wheel arm to the pickup assembly frame.

10. The pickup assembly of claim 1, further comprising a support wheel actuator configured to move the at least one support wheel from a first position with respect to the pickup assembly frame to a second position with respect to the pickup assembly frame.

11. A control system for controlling the at least one support wheel of the pickup assembly of claim 10, the control system comprising one or more controllers configured to:

receive a first signal indicative of a ground surface location;

determine a support wheel deployment position based on the ground surface location; and issue a control signal to cause the support wheel actuator to move the at least one support wheel to the second position.

12. The control system of claim 11, where the one or more controllers are further configured to:

receive a second signal indicative of a mode of operation of the pickup assembly, wherein the second signal comprises a signal indicative of a first mode of operation indicative of use of the pickup assembly for crop collection, or a signal indicative of a second mode of operation indicative of transport of the agricultural harvester from one crop collection location to another; and determine the support wheel deployment position in dependence on the mode of operation.

13. An agricultural harvester comprising the pickup assembly of claim 1.

14. The agricultural harvester of claim 13, configured to support the pickup assembly in an operational position during a crop collection operation, and in a transport position during movement of the agricultural harvester from one crop collection location to another, wherein, when the pickup assembly is in the transport position, the at least one support wheel is adjustable from a retracted position in which the at least one support wheel does not make contact with a ground surface, to an extended position in which the at least one support wheel does make contact with the ground surface.

* * * * *